(12) United States Patent
Yamamoto

(10) Patent No.: US 6,354,704 B2
(45) Date of Patent: *Mar. 12, 2002

(54) PROGRESSIVE POWER SPECTACLE LENS (75) Inventor: Chikara Yamamoto, Saitama-ken (JP)

(73) Assignee: Asahi Kogaku Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,454

(22) Filed: Mar. 18, 1999

(30) Foreign Application Priority Data

Mar. 18, 1998 (JP) .......................... 10-068223

(51) Int. Cl.⁷ ................................ G02C 7/06
(52) U.S. Cl. ..................................... 351/169
(58) Field of Search ................ 351/168, 169, 351/170, 171, 172

(56) References Cited

U.S. PATENT DOCUMENTS

| | | | |
|---|---|---|---|
| 4,640,593 A | 2/1987 | Shinohara | 351/169 |
| 4,950,057 A | 8/1990 | Shirayanagi | 351/169 |
| 4,988,182 A | 1/1991 | Takahashi et al. | 351/169 |
| 5,210,553 A | 5/1993 | Barth et al. | 351/169 |
| 5,708,492 A * | 1/1998 | Kitani | 351/169 |
| 5,710,615 A * | 1/1998 | Kitani | 351/169 |
| 5,719,657 A | 2/1998 | Izawa et al. | 351/169 |
| 5,719,658 A | 2/1998 | Ahsbahs et al. | 351/169 |
| 5,844,657 A | 12/1998 | Shirayanagi | 351/169 |
| 6,213,603 B1 | 4/2001 | Altheimer et al. | |

FOREIGN PATENT DOCUMENTS

| | | |
|---|---|---|
| EP | 738911 | 10/1996 |
| GB | 2274177 | 7/1994 |
| JP | 59-58415 | 4/1984 |
| JP | 1221722 | 9/1989 |
| JP | 4500870 | 2/1992 |
| JP | 8136868 | 5/1996 |
| JP | 11-513139 | 11/1999 |
| WO | 91/01508 | 2/1991 |
| WO | 98/01787 | 1/1998 |

OTHER PUBLICATIONS

Guilino, G. H. : "Design Philosophy for Progressive Addition Lenses", Applied Optics, vol. 32, No. 1, pp. 111–117 (Optical Society of America) published Jan. 1993.

An English abstract of WO 98/01787.

* cited by examiner

Primary Examiner—Scott J. Sugarman
(74) Attorney, Agent, or Firm—Greenblum & Bernstein, P.L.C.

(57) ABSTRACT

A progressive power spectacle lens includes a distance portion having a dioptric power for distance vision, a near portion having a dioptric power for near vision; and an intermediate portion having a progressive dioptric power for vision at ranges intermediate between distance and near. A main meridian is not an umbilical line. A predetermined surface astigmatism is provided on the main meridian. In the near portion, the surface astigmatism decreases and then increases as the distance from the main meridian increases in a horizontal direction.

5 Claims, 9 Drawing Sheets

PROGRESSIVE POWER SPECTACLE LENS

BACKGROUND OF THE INVENTION

The present invention relates to a progressive power spectacle lens with a dioptric power varying progressively between a distance portion and a near portion.

Figure 17:
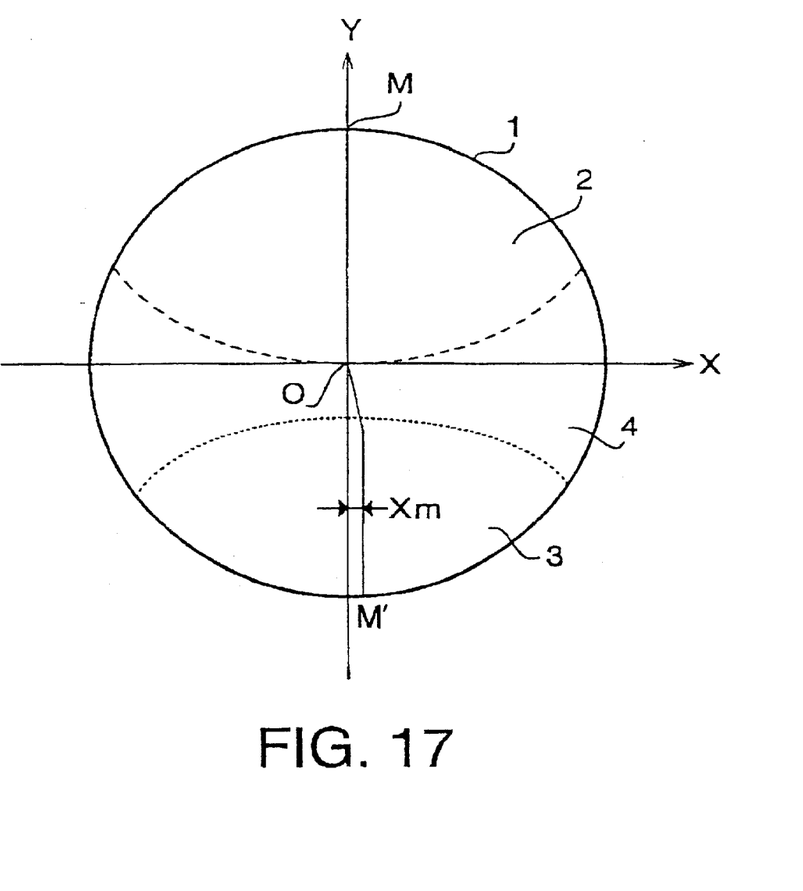
FIG. 17 shows a general distribution of portions on the progressive side surface of a progressive power spectacle lens.

FIG. 17 is a front view (viewed from an object side) of a progressive power spectacle lens 1 for a right eye. The lens 1 includes:

a distance portion 2 having a dioptric power for distance vision at an upper area of the lens;

a near portion 3 having a dioptric power for near vision at a lower area of the lens; and an intermediate portion 4 between the near and distance portions.

A dioptric power in the intermediate portion 4 progressively varies from the upper portion to the lower portion. Such a power is given by the asymmetrical shape formed on the front or rear surface, which is referred to as a progressive side surface.

A rectangular coordinate is defined by a fitting point O as an origin, a horizontal X-axis, and a vertical Y-axis. The fitting point O is the point on the progressive side surface of the lens 1 determined by a manufacturer as a reference point for positioning the lens in front of the eye.

The power of the progressive side surface varies along a main meridian MM' that is a virtual centerline extending substantially along the vertical direction. Specifically, the main meridian MM' is coincident with the Y-axis in the distance portion 2, while it is bent toward a nasal side in the intermediate portion 4, and extends vertically with being shifted toward the nasal side in the near portion 3 by an amount Xm.

The progressive power spectacle lens 1 must include surface astigmatism on the progressive side surface since the distance portion and the near portion, which have different dioptric powers, are smoothly connected. In particular, a zone along the main meridian MM' is a center of a view field of a user, and accordingly, it is desirable that the astigmatism along the main meridian MM' is minimized in order to provide a clear vision zone. The clear vision zone is a zone through which a user obtains a natural and comfortable view.

In one type of the conventional progressive power lenses, the main meridian MM' is designed as an umbilical line along which a surface astigmatism has a value of zero.

Conventionally, a progressive power lens is designed with a surface performance evaluation of a progressive side surface (referred hereinafter as "a surface evaluating design") to reduce complicated and expensive calculation work. The lens having the umbilical main meridian results in good performance in terms of the surface performance evaluation. However, the lens having a good surface performance does not always have a good transmission performance in a transmitting performance evaluation using the ray-tracing method. The transmission performance (which corresponds to a worn condition) is more important than the surface performance for actual products.

It should be noted that two types of astigmatism are used in the specification. "A surface astigmatism" is an absolute value of the difference between the dioptric power of the progressive side surface in a maximum curvature direction where the curvature has the maximum value, and the dioptric power of the surface in a direction where the curvature has the minimum value. The surface astigmatism is only determined by the shape of the progressive side surface. On the other hand, "a resultant astigmatism" is an astigmatism caused on a fundus of an eye through the lens.

When a progressive power spectacle lens is provided with a large base curve, the transmission performance is substantially coincident with the surface performance. This means that the good transmission performance lens can be designed by the surface evaluating design. However, the large curvature of the lens results in a heavy and thick lens.

Recently, a small base curve is generally required to obtain a light and thin lens even in the field of the progressive power spectacle lens. When the progressive power spectacle lens is designed so as to have a small base curve, the transmission performance is not coincident with the surface performance. That is, the lens having the umbilical main meridian results in insufficient transmission performance.

Japanese provisional patent publication Nos. SHO 59-58415, HEI 1-221722, HEI 8-136868 and HEI 4-500870 (the counterpart of PCT international patent publication WO91/01508) disclose the progressive power spectacle lenses that have non-umbilical main meridians. Although each of the publications teaches the surface astigmatism along the main meridian, none of the publications disclose the variation of the surface astigmatism along the horizontal direction.

SUMMARY OF THE INVENTION

It is therefore an object of the present invention to provide an improved progressive power spectacle lens, which has an enlarged clear vision zone with employing a small base curve.

For the above object, according to the present invention, there is provided a progressive power spectacle lens, which includes:

a distance portion having a dioptric power for distance vision;

a near portion having a dioptric power for near vision; and an intermediate portion having a progressive dioptric power for vision at ranges intermediate between the distance and near portions;

wherein a predetermined surface astigmatism is provided on a main meridian, and the surface astigmatism decreases and then increases as the distance from the main meridian increases in a horizontal direction within the near portion.

The variation of the surface astigmatism is desirable to satisfy the condition (1) on at least one point in the range of $-30<Y<-15$, and further to satisfy the condition (2) on at least one point in the overlapped range of $-30<Y<-15$ and $3<|X-Xm|<10$, when a rectangular coordinate (unit: mm) is defined by a fitting point O as an origin, a horizontal X-axis and a vertical Y-axis;

$$AS(Xm, Y)>0.2, \quad (1)$$

and $$AS(Xm, Y)-AS(X, Y)>0.05, \quad (2)$$

where

AS (x, y) is the surface astigmatism at the point (x, y), and

Xm is a displacement (i.e., a distance along the X-axis) of the main meridian from the Y-axis defined by $Xm=f(Y)$.

Further, the maximum curvature direction $\theta(x, y)$ that is defined as an angle (unit: degree) with respect to the X-axis at the point (x, y) is desirable to satisfy the conditions (3) and (4);

$$-10° < \theta(Xm, Y) < 10°, \qquad (3)$$

and $$60° < |\theta(Xm \pm 10, Y)| < 90°, \qquad (4)$$

where the surface astigmatism at the points satisfying the conditions (3) and (4) are larger than 0.2.

DESCRIPTION OF THE EMBODIMENTS

First and second embodiments will be described hereinafter in contrast to comparative examples. The progressive power spectacle lens according to each of the embodiments includes a distance portion having a dioptric power for distance vision, a near portion having a dioptric power for near vision, and an intermediate portion having a progressive dioptric power for vision at ranges intermediate between distance and near portions.

A main meridian is not an umbilical line. A predetermined surface astigmatism is provided on the main meridian as defined by condition (1) on at least one point in the range of −30<Y<−15 when a rectangular coordinate (unit: mm) is defined by a fitting point O as an origin, a horizontal X-axis, and a vertical Y-axis;

$$AS(Xm, Y) > 0.2, \qquad (1)$$

where

AS (x, y) is the surface astigmatism at the point (x, y), and

Xm is a displacement (i.e., a distance along the X-axis) of the main meridian from the Y-axis defined by Xm=f (Y).

Figure 15:
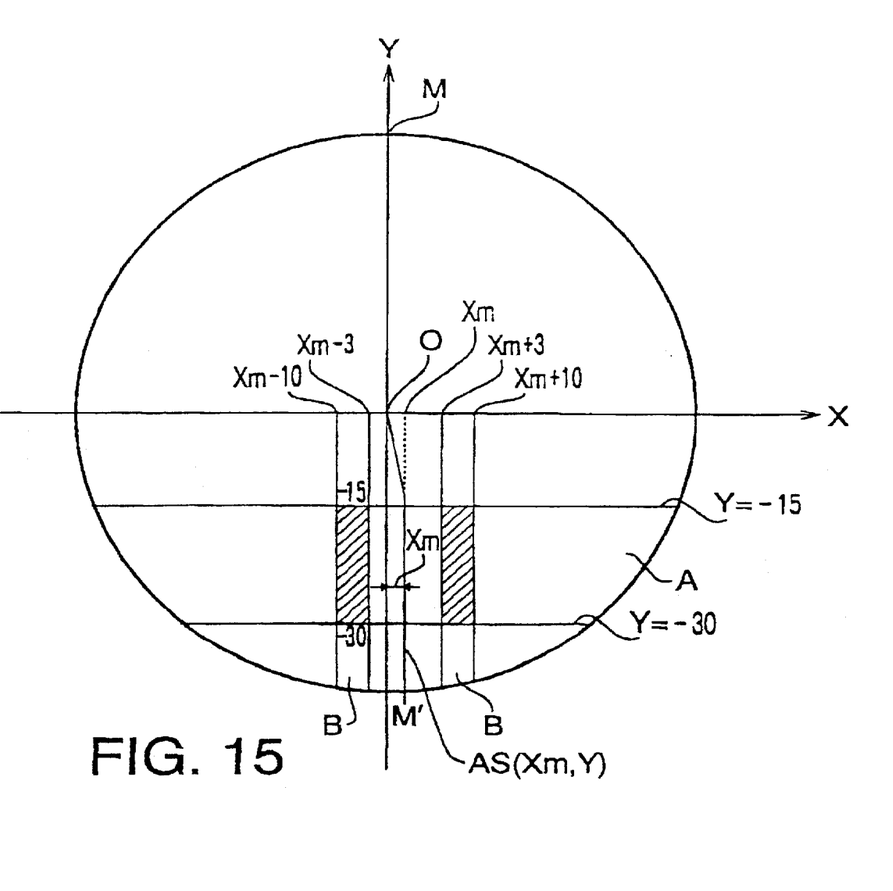
FIG. 15 shows rectangular coordinates on a progressive power spectacle lens.

FIG. 15 shows the rectangular coordinate on the progressive power spectacle lens. The range of −30<Y<−15 is indicated by "A".

In the near portion, the surface astigmatism decreases and then increases as the distance from the main meridian MM' increases in a horizontal direction (i.e., in the X-axis direction) within a clear vision zone. Such a distribution of the surface astigmatism is effective to enlarge the width of the clear vision zone. The variation of the surface astigmatism satisfies condition (2) on at least one point in the overlapped range of −30<Y<−15 and 3<|X−Xm|<10;

$$AS(Xm, Y) - AS(X, Y) > 0.05. \qquad (2)$$

In FIG. 15, the range of 3<|X−Xm|<10 is indicated by "B". Condition (2) is satisfied in the ranges (shown by hatching) where the ranges A and B overlap. Optionally, the range B may be limited to 5<|X−Xm|<10.

Further, the maximum curvature direction θ(x, y) that is defined as an angle (unit: degree) with respect to the X-axis at the point (x, y) satisfies conditions (3) and (4);

$$-10° < \theta(Xm, Y) < 10°, \qquad (3)$$

and $$60° < |\theta(Xm \pm 10, Y)| < 90°, \qquad (4)$$

where the surface astigmatism at the points satisfying conditions (3) and (4) are larger than 0.2.

Figure 16:
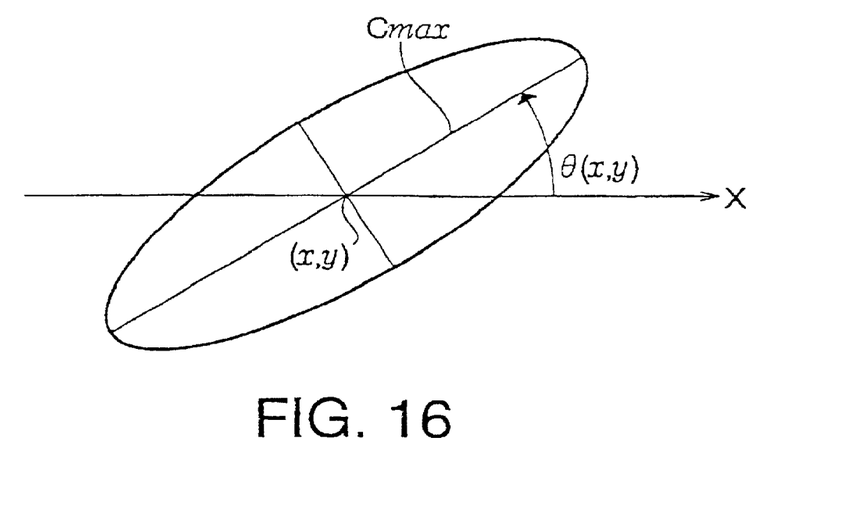
FIG. 16 is a graph showing the definition of the maximum curvature direction; and FIG.

The dioptric power at a point on the progressive side surface can be described as an ellipse as shown in FIG. 16. The size of the ellipse indicates the dioptric power at the point (x, y). The point having the surface astigmatism is indicated by an ellipse, while an umbilical point is indicated by a circle. A major axis Cmax of the eclipse represents the direction of the maximum curvature thereof, and the angle of the major axis Cmax with respect to the X-axis is the maximum curvature direction θ(x, y).

Condition (3) requires that the maximum curvature direction on the main meridian MM' is substantially parallel to the horizontal direction (X-axis), and condition (4) requires that the maximum curvature direction at the points distant from the main meridian by ±10 mm is substantially perpendicular to the horizontal direction.

Satisfaction of the condition (3) reduces the resultant astigmatism on the main meridian MM'. When the condition (4) is satisfied, a distortion can be effectively corrected.

[First Embodiment]

Figure 1:
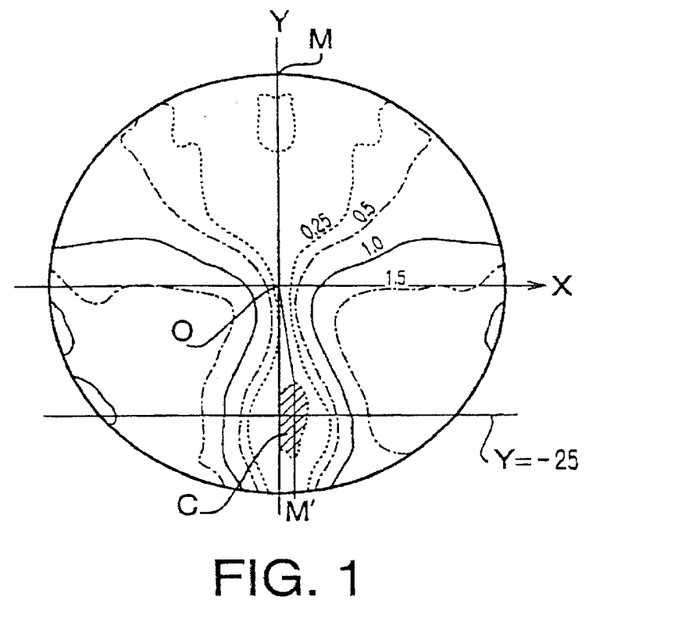
FIG. 1 is a map showing a surface astigmatism distribution on a progressive side surface of a spectacle lens according to a first embodiment.

FIG. 1 is a map of a surface astigmatism distribution on a progressive side surface of the progressive power spectacle lens according to the first embodiment. Specifications of the lens are as follows:

Base curve: 5.00 [D]

SPH (a dioptric power at a distance design reference point): +2.00 [D]

Addition power: 2.00 [D]

As shown in FIG. 1, the near portion of the lens includes a zone C (shown by hatching) in which the surface astigmatism is larger than 0.20 [D] along the main meridian MM'. The displacement Xm is equal to 2.5 mm in a range of $-40<Y<-19$.

Figure 2:
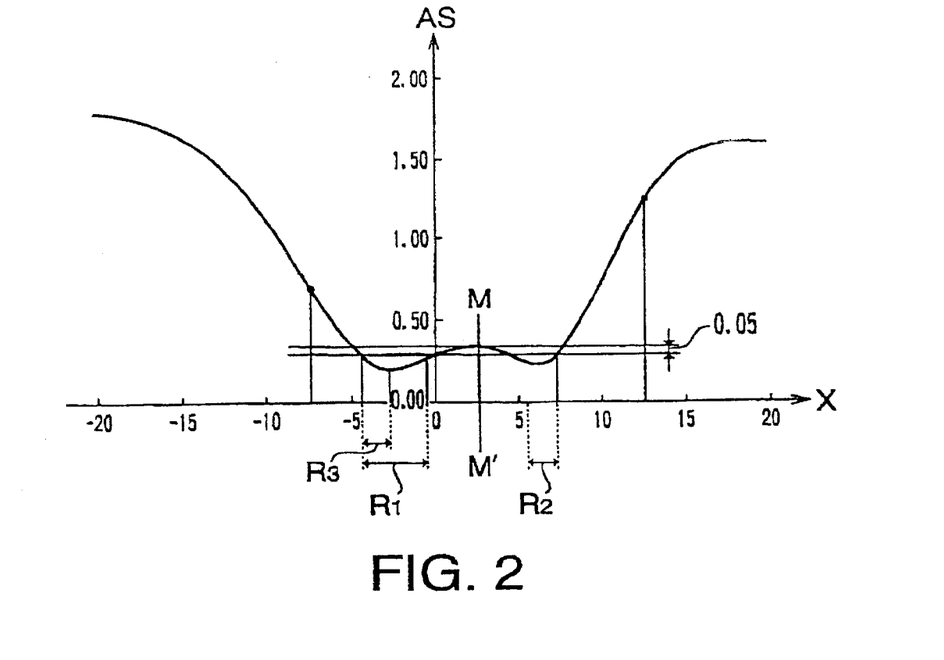
FIG. 2 is a graph showing a variation of the surface astigmatism of the lens shown in FIG. 1 along a horizontal line at Y=−25.
Figure 3:
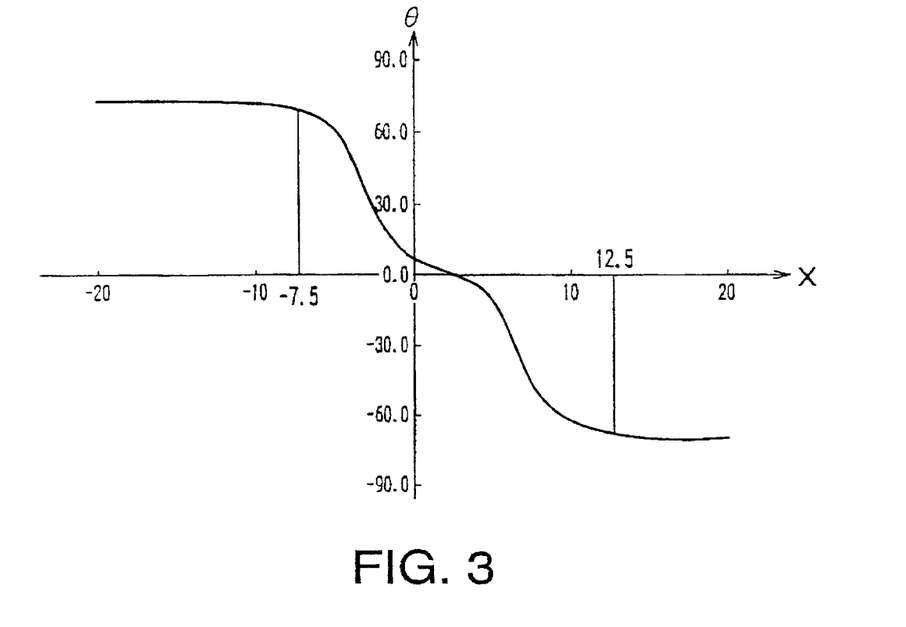
FIG. 3 is a graph showing a variation of a maximum curvature direction of the lens shown in FIG. 1 along a horizontal line at Y=−25.

FIGS. 2 and 3 are graphs showing a variation of the surface astigmatism AS (X, −25) and a variation of the maximum curvature direction θ(X, −25) of the lens shown in FIG. 1 respectively. As shown in FIG. 2, the surface astigmatism decreases and then increases as the distance from the main meridian MM' increases within the clear vision zone. Further, the maximum curvature direction varies along the horizontal direction as a monotonic function as shown in FIG. 3. The first embodiment satisfies conditions (1) though (4) as follows.

(1) AS(Xm, Y)=AS(2.5, −25)=0.33. This value is larger than 0.2 and thus the condition (1) is satisfied.

(2) AS(Xm, Y)−AS(X, Y)=AS(2.5, −25)−AS(0, −25) >0.05.

If the range B (shown in FIG. 15) is defined by 3<|X−Xm|<10, condition (2) is satisfied in a range R1 (shown in FIG. 2) of −4.5<X<−0.5 and in a range R2 of 5.5<X <7.4 under the condition of Y=−25. If the range B is defined by 5<|X −Xm|<10, condition (2) is satisfied in a range R3 of −4.5<X<−2.5 under the condition of Y=−25.

(3) θ(Xm, Y)=θ(2.5, −25)=0°. This value falls within the range of condition (3).

(4) θ(Xm−10, Y)=θ(−7.5, −25)=69°, and θ(Xm±10, Y)=θ (12.5, −25)=−69°. These values fall within the range of the condition (4).

Since the surface astigmatism AS(2.5, −25)=0.33, AS(−7.5, −25)=0.75 and AS(12.5, −25)=1.22, the premise of conditions (3) and (4) are satisfied.

Figure 4:
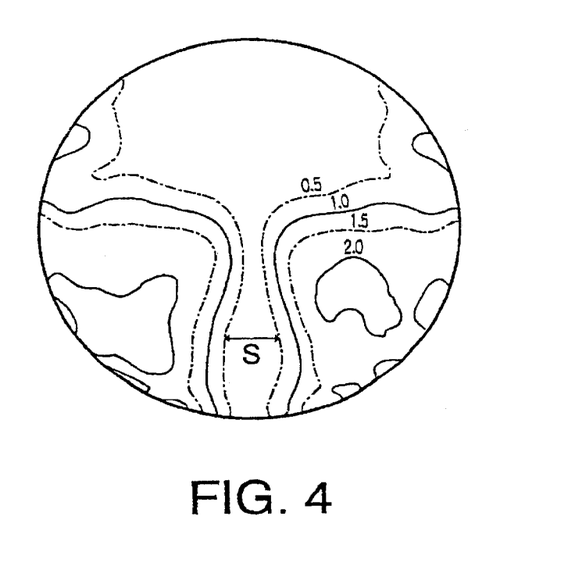
FIG. 4 is a distribution map showing a resultant astigmatism distribution of the lens shown in FIG. 1.

A distribution of the resultant astigmatism, which is obtained by the transmitting evaluation, according to the first embodiment is shown in FIG. 4. The width of the clear vision zone S, in which the resultant astigmatism is lower than 0.5, is equal to 11 mm.

COMPARATIVE EXAMPLE 1

Figure 5:
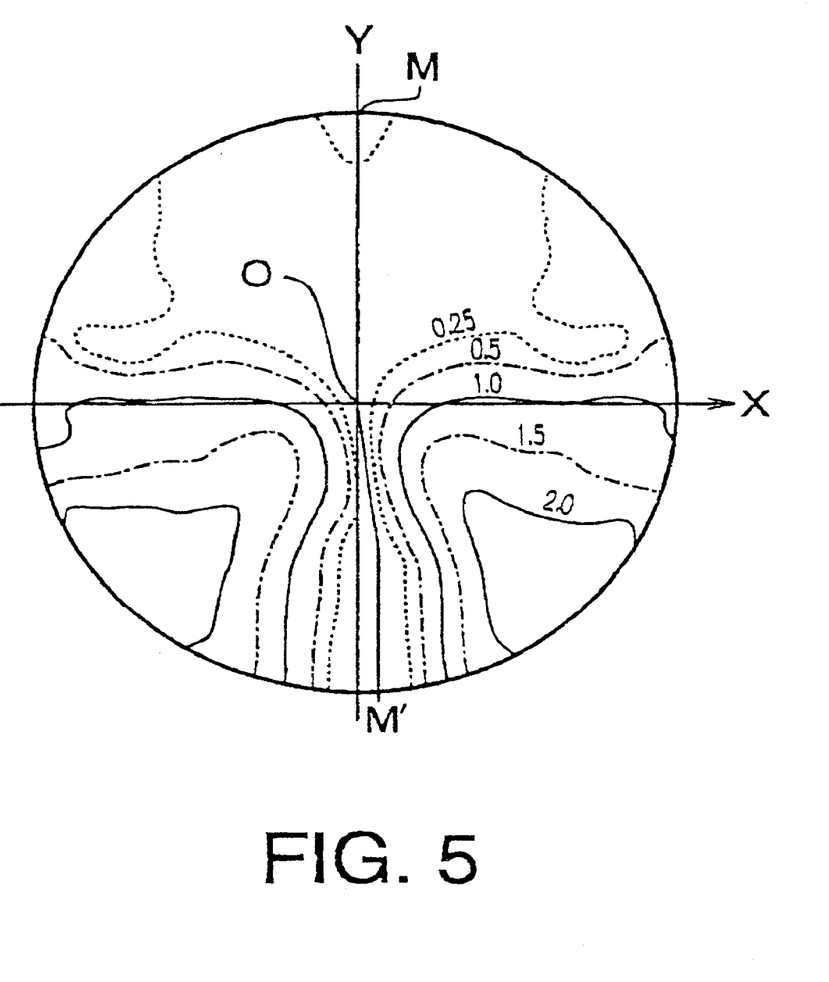
FIG. 5 is a distribution map of a surface astigmatism distribution on a progressive side surface of the spectacle lens according to a comparative example 1 that is not an embodiment.

FIG. 5 shows a map of a surface astigmatism distribution on a progressive side surface of the comparative example 1. This example is described for indicating the compared effect of the first embodiment and it is not an embodiment of the invention. The lens of the example 1 has the same specification as the first embodiment in the base curve, SPH and the additional power, while the lens is designed so that the surface performance is optimized. That is, the main meridian is designed as an umbilical line.

Figure 6:
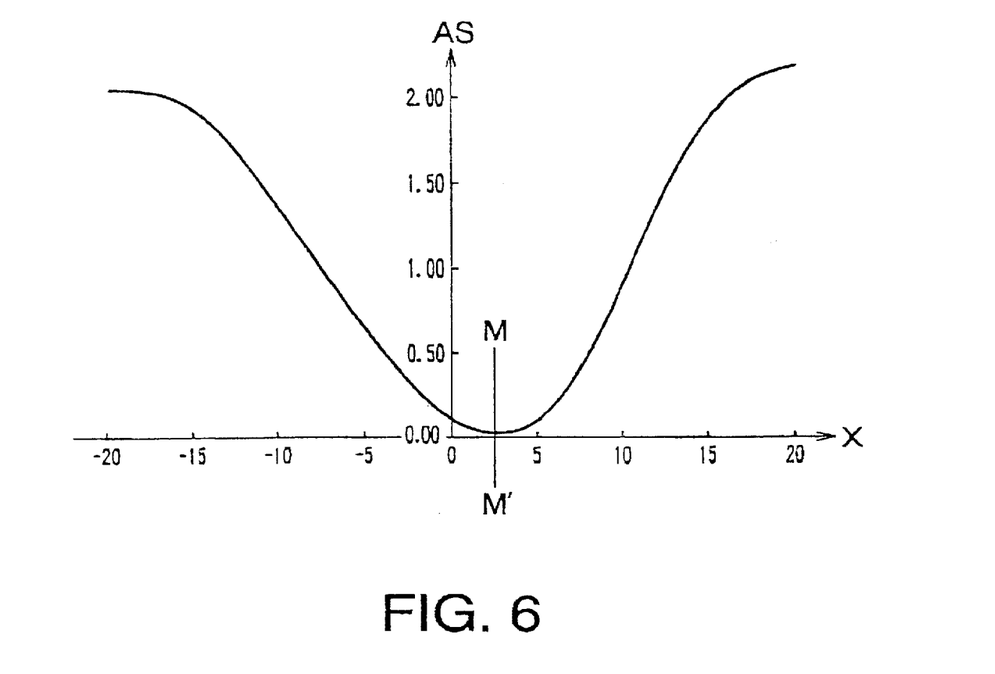
FIG. 6 is a graph showing a variation of the surface astigmatism of the lens shown in FIG. 5 along a horizontal line at Y=−25.

FIG. 6 is a graph showing a variation of the surface astigmatism AS(X, −25) of the lens shown in FIG. 5. As shown in FIG. 6, the surface astigmatism is almost equal to zero on the main meridian MM' and it monotonically increases as the distance from the main meridian MM' increases.

Figure 7:
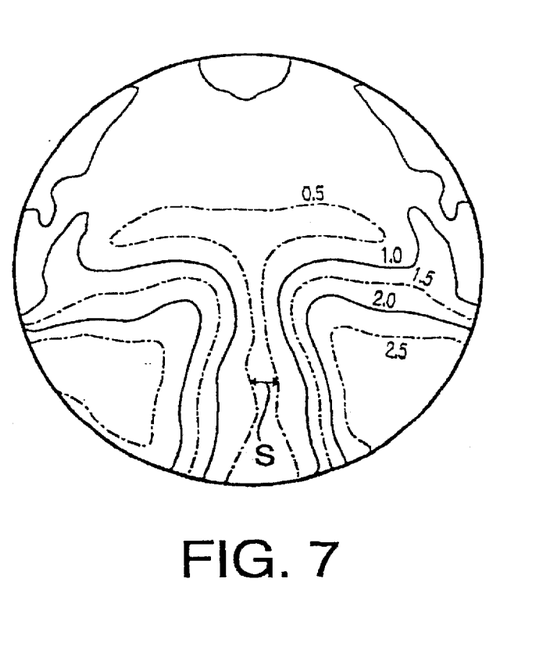
FIG. 7 is a distribution map showing a resultant astigmatism distribution of the lens shown in FIG. 5.

A distribution of the resultant astigmatism according to the example 1 is shown in FIG. 7. The width of the clear vision zone s is 4 mm.

It is understood, by comparing the first embodiment with the comparative example 1, that the distribution of the surface astigmatism of the first embodiment is effective to enlarge the clear vision zone S.

[Second Embodiment]

Figure 8:
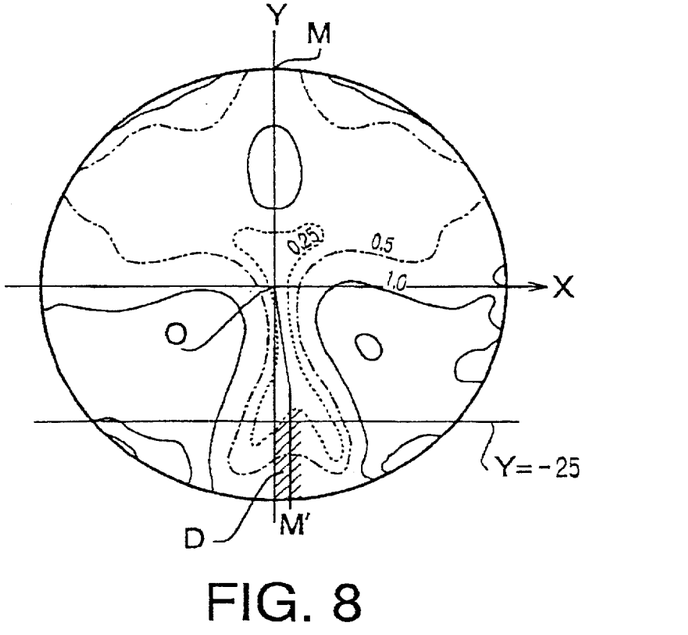
FIG. 8 is a distribution map showing a surface astigmatism distribution on a progressive side surface of the spectacle lens according to a second embodiment.

FIG. 8 is a map of a surface astigmatism distribution on a progressive side surface of the progressive power spectacle lens according to the second embodiment. Specifications of the lens are as follows:

Base curve: 2.00 [D]

SPH: −4.00 [D]

Addition power: 2.00 [ED]

As shown in FIG. 8, the near portion of the lens includes a zone D (shown by hatching) in which the surface astigmatism is larger than 0.20 [D] along the main meridian MM'. The displacement Xm is equal to 2.5 mm in a range of $-40<Y<-19$.

Figure 9:
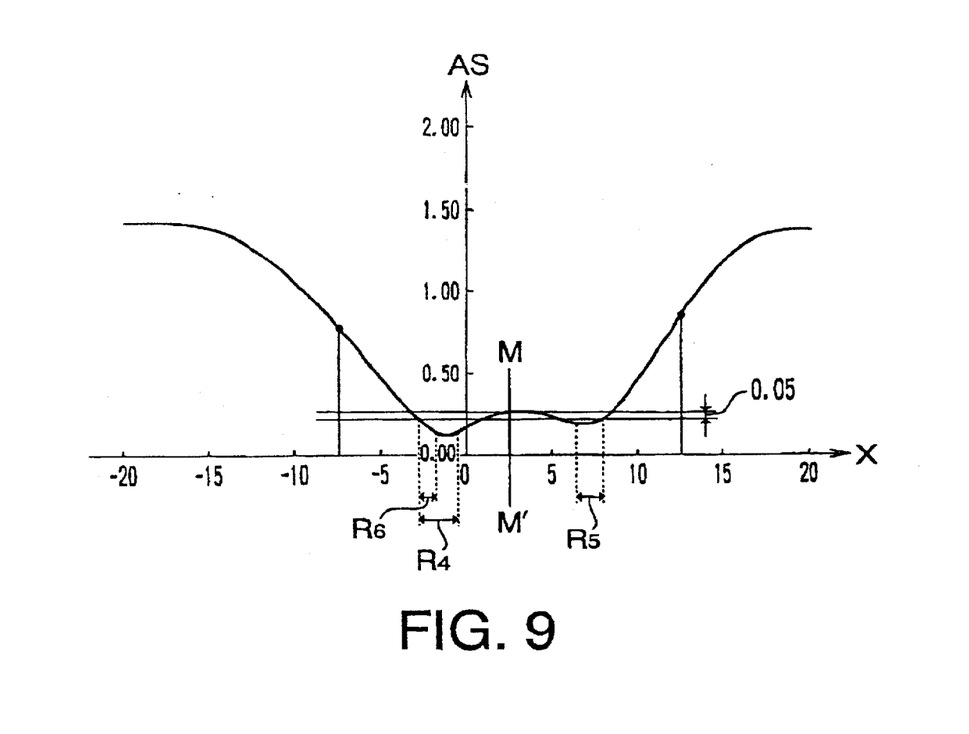
FIG. 9 is a graph showing a variation of the surface astigmatism of the lens shown in FIG. 8 along a horizontal line at Y=−25.
Figure 10:
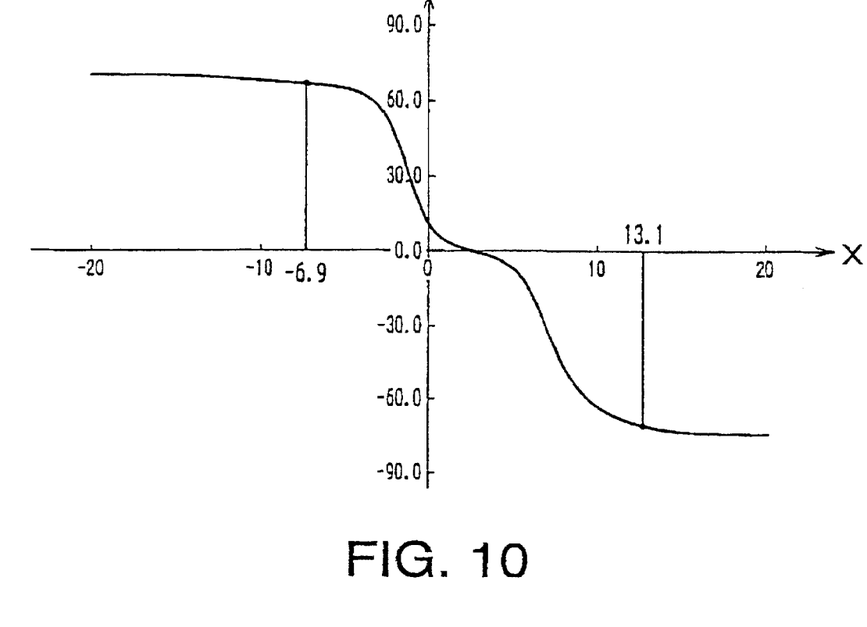
FIG. 10 is a graph showing a variation of the maximum curvature direction of the lens shown in FIG. 8 along a horizontal line at Y=−25.

FIGS. 9 and 10 are graphs showing a variation of the surface astigmatism AS(X, −25) and a variation of the maximum curvature direction θ(X, −25) of the lens shown in FIG. 8 respectively. As shown in FIG. 9, the surface astigmatism decreases and then increases as the distance from the main meridian MM' increases within the clear vision zone. Further, the maximum curvature direction varies along the horizontal direction as a monotonic function as shown in FIG. 10. The second embodiment satisfies the conditions (1) though (4) as follows.

(1) AS(Xm, Y)=AS(2.5, −25)=0.26. This value is larger than 0.2 and thus the condition (1) is satisfied.

(2) AS(Xm, Y)−AS(X, Y)=AS(2.5, −25)−AS(0, −25) >0.05. If the range B (shown in FIG. 15) is defined by 3<|X−Xm|<10, the condition (2) is satisfied in a range R4 (shown in FIG. 9) of −2.7<X<−0.5 and in a range R5 of 5.5<X<8.2 under the condition of Y=−25. If the range B is defined by 5<|X−Xm|<10, the condition (2) is satisfied in a range R6 of −2.7<X <−2.5 under the condition of Y=−25.

(3) θ(Xm, Y)=θ(2.5, −25)=0°. This value falls within the range of the condition (3).

(4) θ(Xm−10, Y)=θ(−7.5, −25)=67°, and θ(Xm+10, Y)=θ (12.5, −25)=−70°. These values fall within the range of the condition (4).

Since the surface astigmatism AS(2.5, −25)=0.26, AS(−7.5, −25)=0.78 and AS(12.5, −25)=0.85, the premise of conditions (3) and (4) are satisfied.

Figure 11:
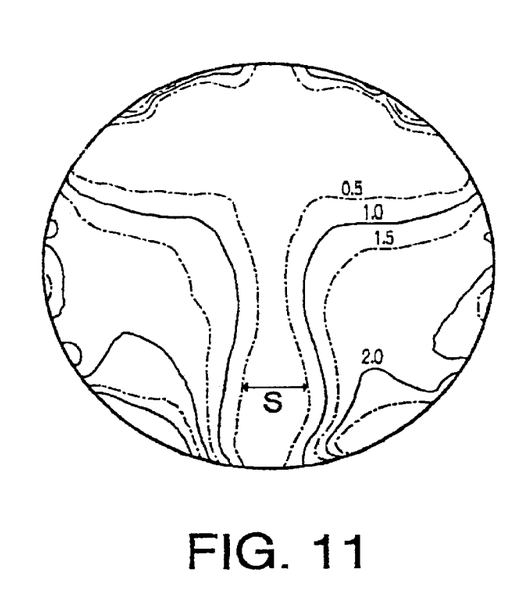
FIG. 11 is a distribution map showing a resultant astigmatism distribution of the lens shown in FIG. 8.

A distribution of the resultant astigmatism, which is obtained by the transmitting evaluation, according to the second embodiment is shown in FIG. 11. The width of the clear vision zone s is equal to 12 mm.

COMPARATIVE EXAMPLE 2

Figure 12:
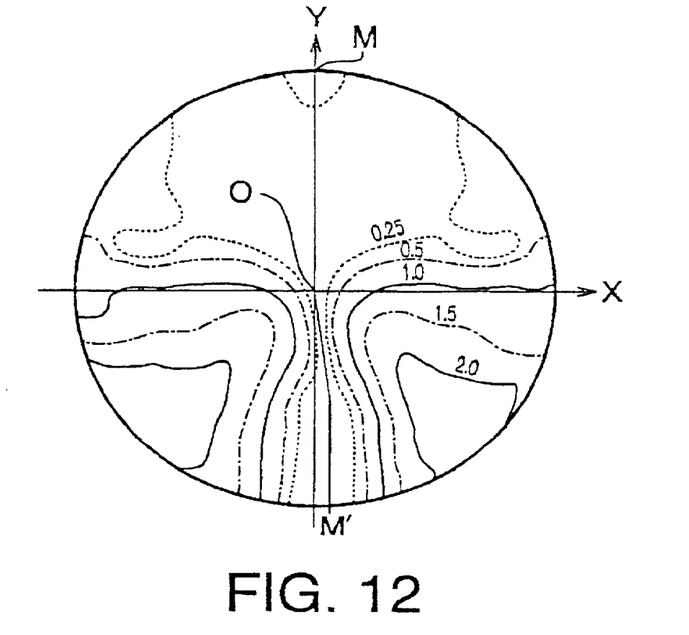
FIG. 12 is a distribution map showing a surface astigmatism distribution on a progressive side surface of the spectacle lens according to a comparative example 2 that is not an embodiment.

FIG. 12 shows a map of a surface astigmatism distribution on a progressive side surface of the comparative example 2. This example is not an embodiment of the invention. The lens of the example 2 has the same specification as the second embodiment in the base curve, SPH and the additional power, while the lens is designed so that the surface performance is optimized. That is, the main meridian is designed as an umbilical line.

Figure 13:
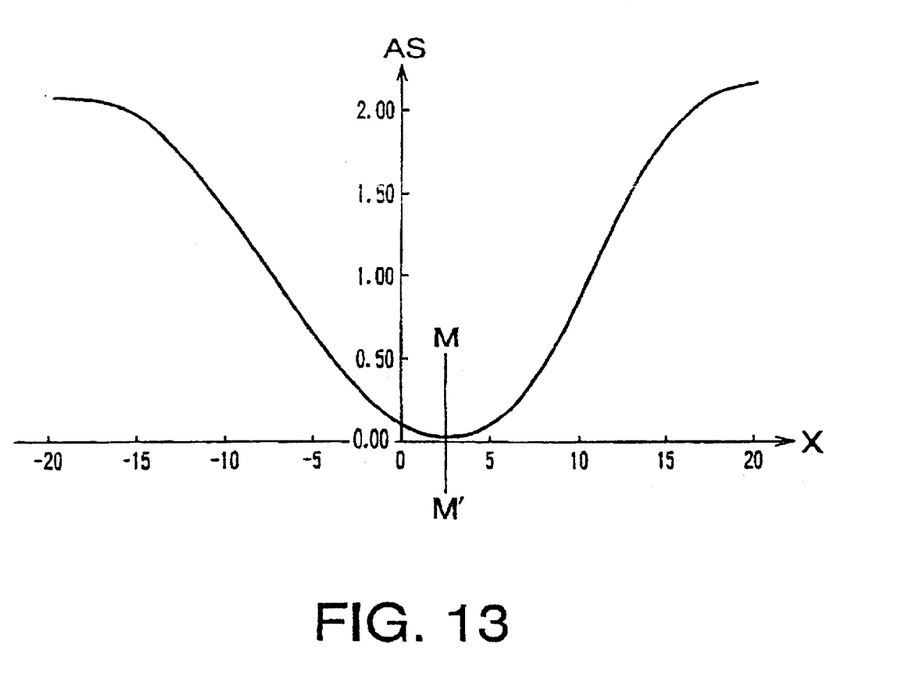
FIG. 13 is a graph showing a variation of the surface astigmatism of the lens shown in FIG. 12 along a horizontal line at Y=−25.

FIG. 13 is a graph showing a variation of the surface astigmatism AS(X, −25) of the lens shown in FIG. 12. As shown in FIG. 13, the surface astigmatism is almost equal to zero on the main meridian MM' and it monotonically increases as the distance from the main meridian MM' increases.

Figure 14:
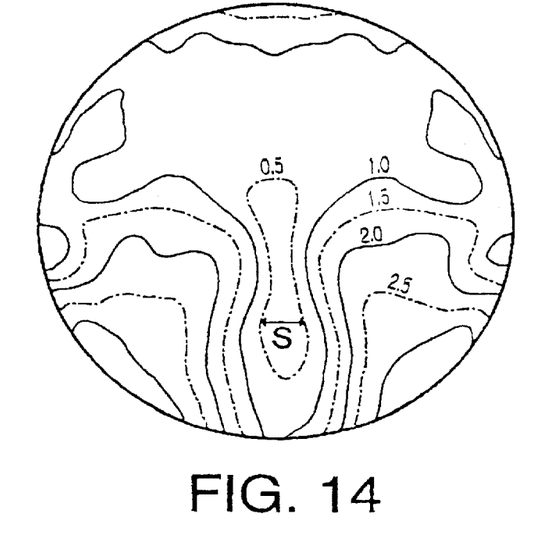
FIG. 14 is a distribution map of a resultant astigmatism distribution of the lens shown in FIG. 12.

A distribution of the resultant astigmatism according to the example 2 is shown in FIG. 14. The clear vision zone is limited at only the center portion of the lens. The width of the clear vision zone s is 7 mm.

It is understood, by comparing the second embodiment with the comparative example 2, that the distribution of the surface astigmatism of the second embodiment is effective to enlarge the clear vision zone.

The present disclosure relates to the subject matter contained in Japanese Patent Application No. HEI 10-068223, filed on Mar. 18, 1998, which is expressly incorporated herein by reference in its entirety.

What is claimed is:

1. A progressive power spectacle lens, including:
   a distance portion having a dioptric power for distance vision;
   a near portion having a dioptric power for near vision; and
   an intermediate portion having a progressive dioptric power for vision at ranges intermediate between the distance and near portions;
   wherein a predetermined surface astigmatism is provided on a main meridian, the surface astigmatism decreasing and then increasing as the distance from the main meridian increases in a horizontal direction within said near portion,
   wherein the variation of said surface astigmatism satisfies the condition (1) on at least one point in the range of $-30<Y<-15$, and further satisfies the condition (2) on at least one point in the overlapped range of $-30<Y<-15$ and $3<|X-Xm|<10$, when a rectangular coordinate (unit:mm) is defined by a fitting point 0 as an origin, a horizontal X-axis and a vertical Y-axis;
   (1) $AS(Xm,Y)>0.2$, and
   (2) $AS(Xm,Y)-AS(X, Y)>0.05$,
   where
   $AS(X,Y)$ is the surface astigmatism at the point (x,y), and
   $Xm$ is a displacement of the main meridian from the Y-axis defined by $Xm=f(Y)$.

2. A progressive power spectacle lens according to claim 1, wherein the condition (2) is satisfied on at least one point in the overlapped range of $-30<Y<-15$ and $5<|X-Xm|<10$.

3. The progressive power spectacle lens according to claim 1, wherein the maximum curvature direction $\theta(x,y)$ that is defined as an angle (unit: degree) with respect to the X-axis at the point (x,y) satisfies the conditions (3) and (4);

$$-10°<\theta(XM,Y)<10°, \quad (3)$$

and $$60°<|\theta(Xm\pm10, Y)|<90°, \quad (4)$$

where the surface astigmatism at the points satisfying the conditions (3) and (4) are larger than 0.2.

4. A progressive power spectacle lens, including:
   a distance portion having dioptric power for distance vision;
   a near portion having a dioptric for near vision; and
   an intermediate portion having a progressive dioptric power for vision at ranges intermediates between the distance and near portions;
   wherein a predetermined surface astigmatism is provided on a main meridian, there are first portions having lower surface astigmatism than that at said main meridan at the right and left sides of said main meridian within said near portion, and there are second portions having higher surface astigmatism than the surface astigmatism at said main meridian on the outer sides of the first portions,
   wherein the variation of said surface astigmatism satisfies the condition (1) on at least one point in the range $-30<Y<-15$, and further satisfies the condition (2) on at least one point in the overlapped range of $-30<Y<-15$ and $3<|X-Xm|<10$, when a rectangular coordinate (unit:mm) is defined by a fitting a point 0as an origin, a horizontal X-axis and a vertical Y-axis;
   (1) $AS(Xm,Y)>0.2$, and
   (2) $AS(Xm,Y)-AS(X,Y)>0.05$,
   where
   $AS(X,Y)$ is the surface astigmatism at the point (x,y), and
   $Xm$ is a displacement of the main meridian from the Y-axis defined by $Xm=f(Y)$.

5. The progressive power spectacle lens according to claim 4, wherein the maximum curvature direction in said near portion varies along the horizontal direction as a monotonic function.

* * * * *